(12) United States Patent
Schramm et al.

(10) Patent No.: US 8,437,950 B2
(45) Date of Patent: May 7, 2013

(54) METHOD FOR INCREASING THE DRIVING STABILITY OF A VEHICLE

(75) Inventors: Herbert Schramm, Leonberg (DE); Falk Hecker, Markgroeningen (DE); Matthias Horn, Leonberg (DE); Ulrich Guecker, Schwieberdingen (DE); Stefan Hummel, Stuttgart (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 1438 days.

(21) Appl. No.: 10/544,307

(22) PCT Filed: Dec. 22, 2003

(86) PCT No.: PCT/EP03/14728
§ 371 (c)(1),
(2), (4) Date: May 5, 2008

(87) PCT Pub. No.: WO2004/067343
PCT Pub. Date: Aug. 12, 2004

(65) Prior Publication Data
US 2008/0208442 A1    Aug. 28, 2008

(30) Foreign Application Priority Data
Jan. 31, 2003    (DE) .................................. 103 03 924

(51) Int. Cl.
*G06F 17/10*    (2006.01)

(52) U.S. Cl.
USPC ............................. 701/124; 701/38; 280/5.5

(58) Field of Classification Search ............. 701/38, 701/70, 72, 124; 280/5.5, 5.507
See application file for complete search history.

(56) References Cited

U.S. PATENT DOCUMENTS

| | | | |
|---|---|---|---|
| 5,406,486 A * | 4/1995 | Kamio et al. ................. 701/84 |
| 6,017,044 A * | 1/2000 | Kawagoe ............... 280/124.106 |
| 6,169,946 B1 | 1/2001 | Griessbach |
| 6,253,123 B1 * | 6/2001 | Schramm et al. ................. 701/1 |
| 6,263,261 B1 * | 7/2001 | Brown et al. ..................... 701/1 |
| 6,324,447 B1 * | 11/2001 | Schramm et al. ................. 701/1 |
| 6,349,247 B1 * | 2/2002 | Schramm et al. ................. 701/1 |
| 6,370,938 B1 | 4/2002 | Leimbach et al. |
| 6,384,719 B1 | 5/2002 | Dieckmann |
| 6,424,907 B1 | 7/2002 | Rieth et al. |
| 6,438,464 B1 | 8/2002 | Woywod et al. |
| 7,003,389 B2 * | 2/2006 | Lu et al. .......................... 701/70 |
| 7,377,522 B2 * | 5/2008 | MacIsaac .................. 280/5.507 |
| 7,440,844 B2 * | 10/2008 | Barta et al. ..................... 701/124 |
| 7,489,995 B2 * | 2/2009 | Yasui et al. ..................... 701/37 |
| 2001/0008986 A1 | 7/2001 | Brown et al. |
| 2003/0055549 A1 * | 3/2003 | Barta et al. ...................... 701/70 |
| 2004/0064237 A1 * | 4/2004 | Lu et al. .......................... 701/70 |
| 2004/0217647 A1 | 11/2004 | Einig et al. |
| 2004/0254703 A1 * | 12/2004 | Traechtler et al. ............. 701/38 |
| 2005/0098964 A1 * | 5/2005 | Brown ......................... 280/5.5 |
| 2006/0030991 A1 * | 2/2006 | Barta et al. ...................... 701/70 |
| 2007/0017735 A1 * | 1/2007 | Kataoka et al. ............... 180/446 |
| 2008/0120005 A1 * | 5/2008 | Lu et al. .......................... 701/70 |
| 2009/0037050 A1 * | 2/2009 | Lu et al. .......................... 701/38 |

FOREIGN PATENT DOCUMENTS

| | | |
|---|---|---|
| DE | 197 36 328 | 2/1999 |
| DE | 197 51 935 | 5/1999 |
| DE | 198 27 881 | 12/1999 |
| DE | 198 56 303 | 1/2000 |
| DE | 199 04 216 | 1/2000 |
| DE | 199 58 221 | 6/2001 |
| DE | 101 28 692 | 12/2001 |
| DE | 101 33 409 | 1/2003 |
| DE | 101 35 020 | 2/2003 |

* cited by examiner

Primary Examiner — Helal A Algahaim
(74) Attorney, Agent, or Firm — Kenyon & Kenyon LLP

(57) ABSTRACT

A method for increasing the driving stability of a vehicle, particularly of a commercial vehicle, which counteracts a vehicle instability by a control intervention in a control system operating the drive and/or the brakes of the vehicle, in which the control intervention occurs as a function of the ratio between the height of the center of gravity of the vehicle and a spring constant of the vehicle suspension.

18 Claims, 1 Drawing Sheet

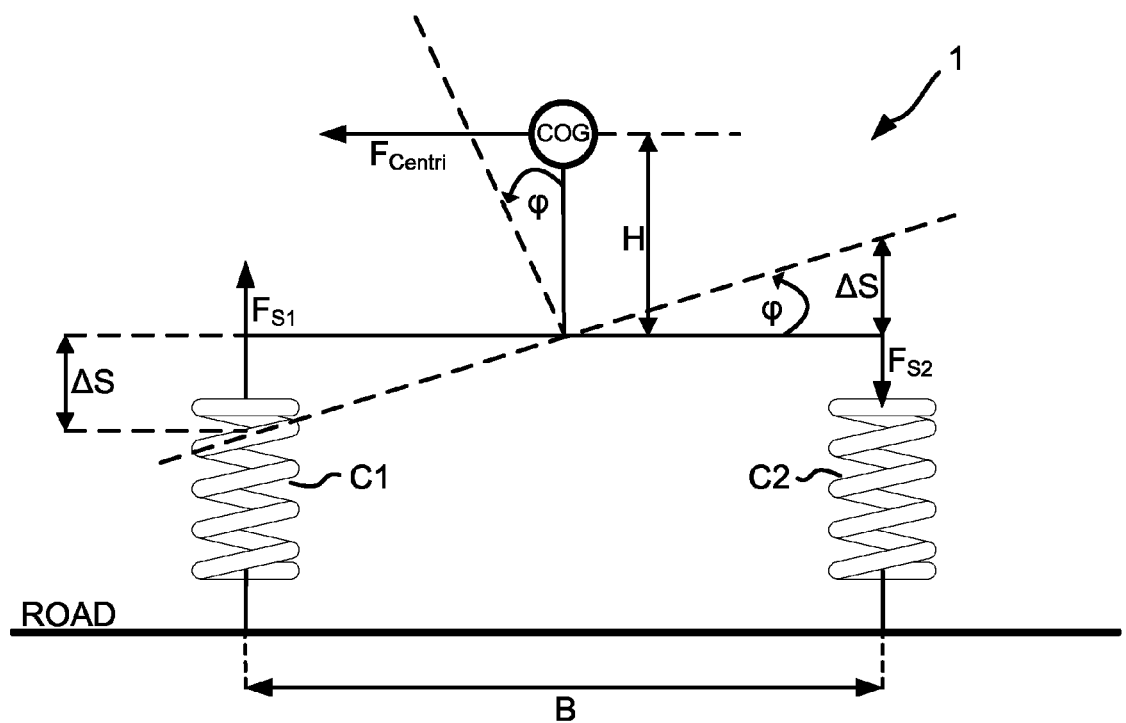

METHOD FOR INCREASING THE DRIVING STABILITY OF A VEHICLE

RELATED APPLICATION INFORMATION

This application is based on International patent application no. PCT/EP03/14278, and therefore claims priority to German patent application no. 103 03 924.4, which was filed on Jan. 31, 2003 in the German patent office. The contents of both applications in their entirety is hereby incorporated by reference.

BACKGROUND INFORMATION

The present invention relates to a method for increasing the driving stability of a vehicle, particularly of a commercial vehicle, which counteracts a vehicle instability by a control intervention in a control system operating the drive and/or the brakes of the vehicle.

Critical situations in commercial vehicles include in particular skidding, jackknifing between tractor and trailer as well as overturning. Methods of the species for reducing the hazard of overturning are understood to be available. For example, within the scope of so-called roll stability systems, commercial vehicles are to be prevented from overturning by targeted engine torque and/or braking interventions.

As characterized, a method of the species according to German Patent Document 198 56 303 provides for measuring the lateral acceleration while cornering and for ascertaining a state variable correlating to the centrifugal acceleration affecting the center of gravity and for calculating the roll angle of the vehicle from the difference weighted by a factor between the measured component of the lateral acceleration and the ascertained centrifugal acceleration. Variable characteristic quantities of the vehicle, by contrast, such as the current location of the center of gravity of the vehicle, which becomes a variable quantity because of the current load condition, do not enter into the turnover sensing. In addition to the current lateral acceleration, the height of the center of gravity, however, is also essential for the turnover resistance, particularly in commercial vehicles that can be loaded and are therefore variable with respect to the height of the center of gravity. Taken by itself, however, this variable can be measured or calculated only with much effort. German patent document no. 197 51 935, for example, refers to a method for ascertaining the height of the center of gravity that is comparatively complex.

By contrast, the present invention is based on the objective of developing further a method of the kind mentioned at the outset in such a way that the respective height of the center of gravity of the vehicle is taken into account without necessitating complex or expensive sensors or measurements for this purpose.

SUMMARY OF THE INVENTION

The basis of the exemplary embodiment and/or exemplary method of the present invention is the improvement of driving stability systems, particularly of roll stability systems, by online assessment or online determination of the roll behavior and/or the overturning limit angle of the vehicle. In this connection, the assessment (extrapolation) is based on the system behavior ascertained online between the vehicle movements and the resulting roll behavior of the vehicle. With the aid of the information acquired thereby, the function of the driving stability system is changed in such a way that an earlier stability intervention is made in the case of low overturning limit angles or pronounced rolling and a later intervention is made in the case of higher overturning limit angles or slight rolling. This allows for increased safety when the locations of the center of gravity are high while at the same time improving the drivability when the locations the center of gravity are low.

Consequently, an objective of the exemplary embodiment and/or exemplary method of the present invention is to improve driving stability systems, particularly roll stability systems, by evaluating the rolling motions or ascertaining the overturning limit angle while cornering.

According to the exemplary embodiment and/or exemplary method of the present invention, the control intervention of the driving stability system occurs as a function of the ratio between the height h of the center of gravity of the vehicle and a spring constant c of the vehicle suspension. Consequently, the essential parameter of the height h of the center of gravity is taken directly into account in the quotient h/c, which forms an identifiable value in any trip. If this value is high, then the permitted lateral acceleration or overturning limit angle is lowered and vice versa. Since it is the quotient h/c and not the height h of the center of gravity itself that is ascertained, it is not necessary for the latter to be known or to be painstakingly determined. The quotient h/c may be ascertained, for example, from the torque equilibrium around an imaginary roll axis.

The quotient h/c then represents a controlled variable, which is a direct measure for the overturning or roll tendency of a vehicle. In accordance with the general definition, roll is to be understood in this context as a motion of the vehicle around the longitudinal axis.

The measures set forth herein make possible advantageous further developments and improvements of the invention specified herein.

Exemplary embodiments of the present invention are explained in greater detail in the following description.

BRIEF DESCRIPTION OF THE DRAWING

The FIGURE shows the vehicle coordinate system (ISO 8855), in which the x-axis points to the front of the vehicle, the y-axis to the left and the z-axis upwards (right hand system).

DETAILED DESCRIPTION

The exemplary method of the present invention provides a method for increasing the driving stability of a vehicle, particularly of a commercial vehicle, which counteracts a vehicle instability by a control intervention in a control system operating the drive and/or the brakes of the vehicle. For example, the control intervention occurs as a function of one or more variables characteristic for the roll behavior and/or for the overturning limit angle of the vehicle, which are ascertained while driving. According to a first alternative, the control intervention occurs as a function of a roll angle φ of the vehicle ascertained while cornering.

The roll motions of a vehicle, particularly of a commercial vehicle, may be ascertained in different ways, the subsequent list being merely exemplary and not final.

According to a first exemplary embodiment, the lateral acceleration $a_{yFrame}$ can be measured at the body of the vehicle and can be related to a lateral acceleration $a_{yAxle}$ measured at an axle. Consequently, the roll angle φ is ascertained between a body and an axle of the vehicle.

Neglecting the roll motions of the axle, the following then holds:

$$a_{yFrame} = a_{yAxle} \cdot \cos\phi + g \cdot \sin\phi \quad (1)$$

where $a_{yFrame}$ is the lateral acceleration of the body,
$a_{yAxle}$ is the lateral acceleration of the axle
g is the gravitational acceleration.

From equation (1) it is then possible to calculate the roll angle $\phi$, for example, using a calculation unit integrated into a control unit of the driving stability system.

According to another exemplary embodiment, the roll angle $\phi$ is ascertained from a measurement of the relative movement between the body and the axle, for example, with the aid of displacement sensors of an air suspension, disregarding the roll motions of the axis, from the following relation (2):

$$\sin\varphi \approx \frac{s_{left} - s_{right}}{b} \quad (2)$$

where $s_{left}$ is the spring travel at the spring pivotal point of the left axle side,
$s_{right}$ is the spring travel at the spring pivotal point of the right axle side,
b is the distance between the two spring pivotal points.

Another measure provides for the roll angle to be ascertained from the following equations (3) and (4), in which the lateral acceleration measured at the body is related to the lateral acceleration calculated from the wheel velocities and/or the yaw rate:

$$a_{yFrame} = a_{yCalc} \cdot \cos\phi + g \cdot \sin\phi \quad (3)$$

where the following holds for the calculated lateral acceleration $a_{yCalc}$:

$$a_{yCalc} = \omega_z \cdot v = \frac{v_{right} - v_{left}}{b} \cdot v \quad (4)$$

where:

$\omega_z$ is the yaw rate,
v is the vehicle velocity,
$v_{right}$ is the velocity of the right side of the vehicle,
$v_{left}$ is the velocity of the left side of the vehicle,
b is the track width.

Furthermore, the roll angle $\phi$ may be ascertained by relating the signals of an angle sensor located on a vehicle axle, which indicates the direction of the acceleration on a plane, to the signals of an acceleration sensor located on the body and measuring the lateral acceleration.

Alternatively, it is possible to evaluate the signals of two angle sensors, one of which is attached to an axle and the other to the body. The difference between the two signals is a measure for the roll angle $\phi$, assuming a negligibly small roll motion of the axle.

A characteristic value may be formed containing the roll angle $\phi$ and/or the lateral acceleration $a_y$ and/or the yaw rate $\omega_z$ of the vehicle, as a function of which the control intervention occurs.

According to another alternative, the control intervention occurs as a function of a ratio, ascertained while cornering, between the height h of the center of gravity of the vehicle and a spring constant c of the vehicle suspension. The ratio between the height h of the center of gravity and the spring constant c may be calculated from the following equation (5), which represents the torque equilibrium around an imaginary roll axis:

$$\Delta s \cdot c \cdot b = m \cdot a_y \cdot h \quad (5)$$

where $\Delta s$ is the difference between the right and left compression travels
c is the spring constant of the suspension,
b is the track width,
m is the mass of the vehicle,
$a_y$ is the lateral acceleration,
h is the height of the center of gravity of the vehicle.

The difference between the compression travels $\Delta s$ and the lateral acceleration $a_y$ is measured by sensors while cornering. The quotient h/c is then a value identifiable during every trip. If this value is high, then the permitted lateral acceleration or overturning limit angle is lowered and vice versa.

Since the roll behavior does not only depend on the height of the center of gravity but also on other factors such as, for example, the roll stiffness and the location of the roll center and since therefore an absolute determination of the overturning limit angle is difficult, the ascertained parameters may be stored in a non-volatile memory and compared to each other for different payloads, especially unloaded and loaded, so as to allow for an improved classification of the overturning tendency as a function of the respective vehicle mass. With the aid of these data, the control intervention of the driving stability system occurs in a more precise manner, in particular taking also into account extreme loads and improving drivability in the sense of avoiding unnecessary intervention in the case of vehicles having flat-lying payloads.

What is claimed is:

1. A method for increasing the driving stability of a vehicle, the method comprising:
   determining a ratio between a height h of a center of gravity of the vehicle and a spring constant c of a vehicle suspension; and
   performing a control intervention to counteract a vehicle instability with a control system by operating at least one of a drive and brakes of the vehicle, wherein the control intervention is performed as a function of the ratio between a height h of the center of gravity of the vehicle and the spring constant c of the vehicle suspension;
   wherein the ratio between the height of the center of gravity and the spring constant is determined while cornering from the following relation:

$$\Delta s \cdot c \cdot b = m \cdot a_y \cdot h, \text{ where}$$

$\Delta s$ is the difference between the right and left compression travels
c is the spring constant of the suspension,
b is the track width,
m is the mass of the vehicle,
$a_y$ is the lateral acceleration,
h is the height of the center of gravity of the vehicle.

2. The method of claim 1, wherein a difference between a compression travels $\Delta s$ and the lateral acceleration $a_y$ is measured by sensors while the vehicle is cornering.

3. The method of claim 2, wherein if the ratio h/c is high, then one of a permitted lateral acceleration and an overturning limit angle is lowered.

4. The method of claim 2, wherein if the ratio h/c is low, then one of a permitted lateral acceleration and an overturning limit angle is increased.

5. The method of claim 2, wherein if the ratio h/c is high, then one of a permitted lateral acceleration and an overturning limit angle is lowered, and wherein if the ratio h/c is low, then one of the permitted lateral acceleration and the overturning limit angle is increased.

6. The method of claim 5, further comprising:
   storing the determined parameters in a non-volatile memory; and
   comparing the determined parameters to each other for different payloads, especially unloaded and loaded, so as to allow for a classification of an overturning tendency as a function of a respective vehicle mass.

7. The method of claim 5, further comprising:
   storing the determined parameters in a non-volatile memory; and
   comparing the determined parameters to each other for unloaded payloads and loaded payloads, so as to allow for a classification of an overturning tendency as a function of a respective vehicle mass.

8. The method of claim 1, wherein if the ratio h/c is high, then one of a permitted lateral acceleration and an overturning limit angle is lowered.

9. The method of claim 1, wherein if the ratio h/c is low, then one of a permitted lateral acceleration and an overturning limit angle is increased.

10. The method of claim 1, wherein if the ratio h/c is high, then one of a permitted lateral acceleration and an overturning limit angle is lowered, and wherein if the ratio h/c is low, then one of the permitted lateral acceleration and the overturning limit angle is increased.

11. The method of claim 10, further comprising:
    storing the determined parameters in a non-volatile memory; and
    comparing the determined parameters to each other for different payloads, especially unloaded and loaded, so as to allow for a classification of an overturning tendency as a function of a respective vehicle mass.

12. The method of claim 10, further comprising:
    storing the determined parameters in a non-volatile memory; and
    comparing the determined parameters to each other for unloaded payloads and loaded payloads, so as to allow for a classification of an overturning tendency as a function of a respective vehicle mass.

13. The method of claim 2, wherein if the ratio h/c is high, then one of a permitted lateral acceleration and an overturning limit angle is lowered.

14. The method of claim 13, further comprising:
    storing the determined parameters in a non-volatile memory; and
    comparing the determined parameters to each other for different payloads, especially unloaded and loaded, so as to allow for a classification of an overturning tendency as a function of a respective vehicle mass.

15. The method of claim 13, further comprising:
    storing the determined parameters in a non-volatile memory; and
    comparing the determined parameters to each other for unloaded payloads and loaded payloads, so as to allow for a classification of an overturning tendency as a function of a respective vehicle mass.

16. The method of claim 2, wherein if the ratio h/c is low, then one of a permitted lateral acceleration and an overturning limit angle is increased.

17. The method of claim 16, further comprising:
    storing the determined parameters in a non-volatile memory; and
    comparing the determined parameters to each other for different payloads, especially unloaded and loaded, so as to allow for a classification of an overturning tendency as a function of a respective vehicle mass.

18. The method of claim 16, further comprising:
    storing the determined parameters in a non-volatile memory; and
    comparing the determined parameters to each other for unloaded payloads and loaded payloads, so as to allow for a classification of an overturning tendency as a function of a respective vehicle mass.

* * * * *

UNITED STATES PATENT AND TRADEMARK OFFICE
CERTIFICATE OF CORRECTION

PATENT NO. : 8,437,950 B2  Page 1 of 1
APPLICATION NO. : 10/544307
DATED : May 7, 2013
INVENTOR(S) : Schramm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2256 days.

Signed and Sealed this
Eighth Day of September, 2015

Michelle K. Lee
*Director of the United States Patent and Trademark Office*